United States Patent [19]

Dunwoodie et al.

[11] 4,412,756
[45] Nov. 1, 1983

[54] STRUCTURAL ELEMENT

[75] Inventors: Edward H. Dunwoodie, Crowthorne; Ronald W. Elston, Burnham, both of England

[73] Assignee: Transequip Limited, Middlesex, Great Britain

[21] Appl. No.: 206,550

[22] Filed: Nov. 13, 1980

[30] Foreign Application Priority Data

Nov. 22, 1979 [GB] United Kingdom ................ 7940377
Jan. 24, 1980 [GB] United Kingdom ................ 8002437

[51] Int. Cl.³ .......................... B25G 3/02; F16D 1/00
[52] U.S. Cl. ...................................... 403/363; 403/408
[58] Field of Search ............... 403/408, 380, 363, 403, 403/205, 388; 52/282, 461

[56] References Cited

U.S. PATENT DOCUMENTS 1,757,664  5/1930  Gohmann ............................ 52/282
1,771,167  7/1930  Dolan ............................ 403/408 X
2,912,013 11/1959  Freyholdt et al. .................... 52/282

FOREIGN PATENT DOCUMENTS

549471   4/1932  Fed. Rep. of Germany ...... 403/388
801031  12/1950  Fed. Rep. of Germany ...... 403/408
515486  12/1939  United Kingdom ................ 403/363

*Primary Examiner*—Andrew V. Kundrat

[57] ABSTRACT

A joint for a sheet and a structural element, which may itself be a sheet. The sheet is along its portion to be joined to said element shaped to have an elongate, substantially trough-shaped part and the element has a complementarily shaped profiled part engageable with the trough-shaped part. The joint includes removable clamping means for taking up forces which, in use, act in a direction tending to disengage said parts. The parts are so shaped that one of the parts is snugly interengageable with the other part such that, where the parts are in contact with each other, loads transmitted, in use, between the sheet and the element are transmitted substantially by compression, that the parts are interengageable by simple insertion of one of the parts into the other, and that the clamping means are, in use, stressed substantially only in tension.

4 Claims, 17 Drawing Figures

STRUCTURAL ELEMENT

The invention relates to a joint for structural elements, a method for joining structural elements, and a container including structural elements interconnected by said joint.

A variety of techniques exists for joining elements of structures, such as containers, where the principal elements are in sheet form. A sheet is an element of a significantly stiff and elastic material having one size, namely its thickness, which is considerably smaller than its other sizes, e.g. the skin of an aircraft wing or a plastics corrugated panel of a car-port roof.

Joining techniques have evolved which fall into two classes: joints which can be assembled and dismantled without disruption of the materials of the structural elements and the joining elements, and joints which cannot. This is equally true when joining one sheet element to another sheet element or when joining a sheet element to another structural element, e.g. a beam, truss or bracket.

In the first class are the commonly used fastening methods, such as pinning and bolting, where loads are transferred from the sheet element to another structural element (sheet element or otherwise) through the fastener as shear, tension and bending. These methods have the major disadvantage that high stresses (intensities of load) are generated at the interfaces of the sheet and the fasteners in comparison to the stresses in the remainder of the sheet. This in turn requires that the structure be heavier than desired, because the thickness of the sheet is often determined by these stress levels at the fastener and/or because more fasteners and larger attachment flanges are required at the joints.

The invention aims to avoid unnecessary weight by utilizing more fully the total strength of the sheet elements throughout and the need for holes in the sheet possessing high accuracies of form and position, and to devise a joint which can be readily dismantled and reassembled without loss of joint efficiency while considerably reducing the number of fasteners used.

The second class of joint has a number of disadvantages well known to the men skilled in the art. Because the invention belongs to the first class the second class will not be further discussed.

The invention will also be compared to the prior art for the assembly of structural elements such as extruded and rolled products, having constant cross-sections throughout their lengths.

The prior art includes interlocking joints which lock together as a jigsaw puzzle, in that one element possesses a feature of its geometric cross-section which fits into a feature of another element. Such joints are generally of two types:

(a) loose fitting, where the joint can be readily dismantled and reassembled but requires significant clearances between the elements. The clearance must be closed by movement of at least one element before loads can be transferred or reversed, producing "rattle", wear and fatigue. Such joints are not normally satisfactory under conditions of vibration, which cause so-called fretting, and do not give the most efficient joints. Typical examples are the slatted roller blind doors on vans and some cabinets.

(b) tight fitting, where the clearances allow initial assembly to take place easily and are sufficiently small to prevent movement, rattling and wear. These joints have the disadvantage that dismantling can be very difficult after they have been assembled for some time, e.g. due to corrosion or ingress of dust and dirt. Typical examples are modern aluminium alloy window frame assemblies.

The invention aims to adopt the benefits of interlocking joints for structural sheet elements while avoiding the disadvantages experienced with solid elements possessing constant cross-sections.

The invention provides a joint for a sheet and a structural element, wherein the sheet is along its portion to be joined to said element shaped to have an elongate, substantially trough-shaped part and the element has a complementarily shaped profiled part engageable with the trough-shaped part, the joint including removable clamping means for taking up forces which, in use, act in a direction tending to disengage said parts, the parts being so shaped that one of the parts is snugly interchangeable with the other part such that, where the parts are in contact with each other, loads transmitted, in use, between the sheet and the element are transmitted substantially by compression, that the parts are interengageable by simple insertion (as hereinafter defined) of one of the parts into the other, and that the clamping means are, in use, stressed substantially only in tension.

The term 'simple insertion' as used herein is intended to mean 'insertion not requiring relative displacement of the parts in their longitudinal direction, or their interengagement by hooking one into the other by rotation of one relative to the other, or deformation, whether permanent or temporary, of any of said parts.

The invention also provides a method of joining a sheet and a structural element (which may itself be a sheet), and a product including a sheet and a structural element connected by a joint according to the invention.

The invention will now be described, by way of example, with reference to the accompanying diagrammatic drawings, in which:

FIGS. 4 to 17 shows practical embodiments of joints using fasteners, although the fasteners were left out from some of the Figures for simplicity.

Figures 1, 2:
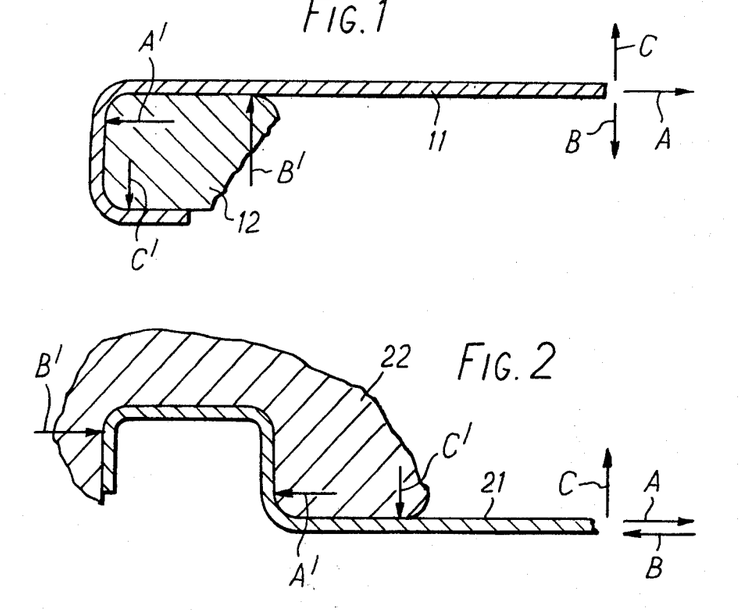
FIGS. 1 to 3 serve for the explanation of the invention in principle and show a first, a second and a third joint, respectively.

FIG. 1 shows a joint between a sheet 11 and an adjacent structural element 12, e.g. a beam. The joint allows tension loads A in the sheet 11 and loads B into or loads C out of the local plane of the sheet 11 to be transferred to the adjacent element 12, which balances the loads A, B and C by reactions A′, B′ and C′, respectively. The adjacent element 12 may be of any form, except at the joint interface, where it must match the form of the sheet 11.

The invention provides for a geometric form of the sheet at the joint which allows component loads to be reacted in a plane at right angles to the loading direction. For instance, in FIG. 1, the tension load A on the sheet 11 is able to be reacted by the other element 12 because the sheet 11 has a portion at right angles to the load A at the point of reaction A′.

A second joint between a sheet 21 and an adjacent element 22 is illustrated in FIG. 2. The joint allows tension loads A and compression loads B in the sheet 21 and loads C out of the local plane of the sheet 21 to be transferred to the adjacent element 22, which balances the load A, B and C by reactions A′, B′ and C′, respectively. Again the adjacent element 22 may be of any form except at the joint interface where it must match the form of the sheet 21.

The joint described in connection with FIGS. 1 and 2 can be combined for the joining of two structural sheet elements 31 and 32 illustrated in FIG. 3. The vertical sheet 31 has in general the form shown in FIG. 1, while the horizontal sheet 32 has in general the form shown in FIG. 2. The sheet 31 has a trough-shaped part, which includes a portion 31a which extends substantially pependicularly to the main vertical body of the sheet 31, a portion 31b which extends substantially perpendicularly to the portion 31a and parallel to the main vertical body of the sheet 31, and a portion 31c which extends substantially perpendicularly to the portion 31b and parallel to the portion 31a. As is apparent from FIG. 3 all the portions and the main body of the sheet 31 are integral, and the portions are formed by bending of its margin. The sheet 32 is made in a similar manner and has a complementary profiled part including a portion 32a which extends substantially perpendicularly to the main horizontal body of the sheet 32, a portion 32b perpendicular to the portion 32a, and a portion 32c perpendicular to the portion 32b.

The straight portions 31a, 31b and 31c of the sheet 31 and the straight portions 32a, 32b and 32c of the sheet 32 may be varied in size to provide for the loads to be reacted over sufficiently large areas, or to ease manufacture, or both, providing that the joint remains sufficiently stiff. Said portions of the profiled margins of the sheets 31 and 32 provide a joint which has the property that loads applied to the sheet 31 balance the loads applied to sheet 32 as follows: load A′ balances load A, load B′ balances load B, and load C′ balances load C.

Figure 3:
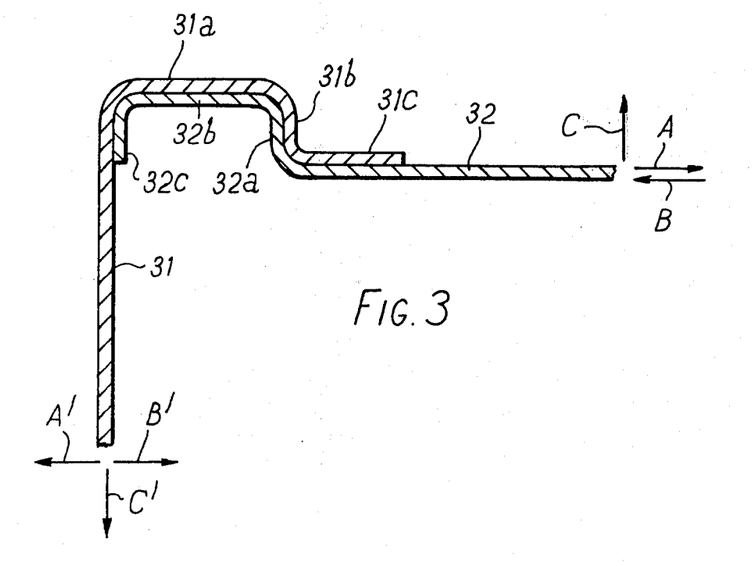

The embodiment of the joint according to FIG. 3 may be modified to react additional loads. Two such modifications will now be described with reference to FIGS. 4 and 5.

Figure 4:
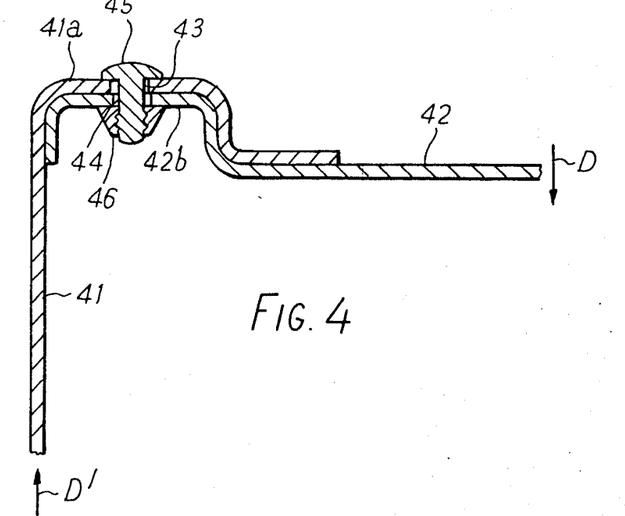
FIG. 4 shows a fourth joint between two sheets.

FIG. 4 shows a vertical sheet 41 and a horizontal sheet 42, profiled along their adjacent margins as described in connection with FIG. 3 and the joint can, naturally, transfer loads in the same manner as described in connection with that figure. As is apparent from FIG. 4 a hole 43 is made in the portion 41a of the sheet 41 and another hole 44 is made in the portion 42b of the sheet 42. The sheets 41 and 42 are connected at their portions 41a and 42b by a two-part fastener 45, 46 the shank of which passes through the holes 43 and 44. The fastener 45, 46 is intended to transfer only the vertical loads D and D′ so that they are balanced. The fastener is designed to take tensile loading only and need not be of the type shown. As is apparent from FIG. 4 the holes are larger than the cross-sectional area of the shank of the fastener to provide sufficient clearance. Consequently the shape of the holes and their position are not crucial, and the holes 43 and 44 need not be coaxial. It is to be understood that the sheets 41 and 42, which are shown in section, are relatively long, so that their portions 41a and 42b are strip-shaped and comprise a plurality of spaced holes and are connected by a plurality of fasteners 45, 46 passing through said holes. For simplicity only one fastener is shown and referred to. The fasteners have the advantage of holding the joint together, at intervals, for handling purposes prior to the application of loads.

Dismantling the joint consists simply of removing the fasteners, e.g. by unscrewing or cutting, depending on the type of the fasteners used, and separating the sheets 41 and 42. Reassembly consists of fitting the matching forms of the sheets 41 and 42 together and either refitting or replacing the fasteners 45, 46. The sheets 41, 42 are not damaged by dismantling and reassembly, and high joint efficiencies can be achieved for loads, except the loads D and D′. The joint would therefore be orientated in any design application so that this load direction corresponded with the direction of the least applied load.

Figure 5:
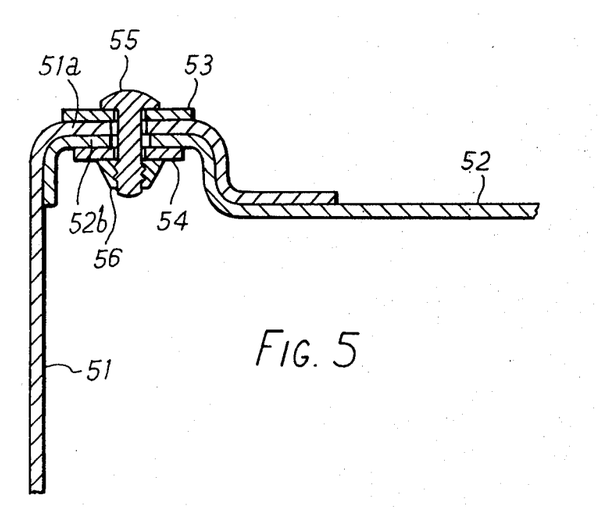
FIG. 5 shows a fifth joint between two sheets using two bearing elements.

FIG. 5 illustrates an embodiment obtained by further development of the embodiment shown in FIG. 4. The development consists in additional components 53 and 54, e.g. washers, strips or other suitable elements, being introduced between the closing parts ("heads" and "nuts") of the fasteners 55, 56 to give a more even distribution of stress in the sheets 51 and 52 at the joint. The components 53 and 54, which serve as bearing elements, could be retained for re-use or discarded when dismantling the joint, as may be more economical for re-assembly. The sheets 51 and 52, which are the most expensive items, are not damaged by dismantling or re-assembly.

Figure 6:
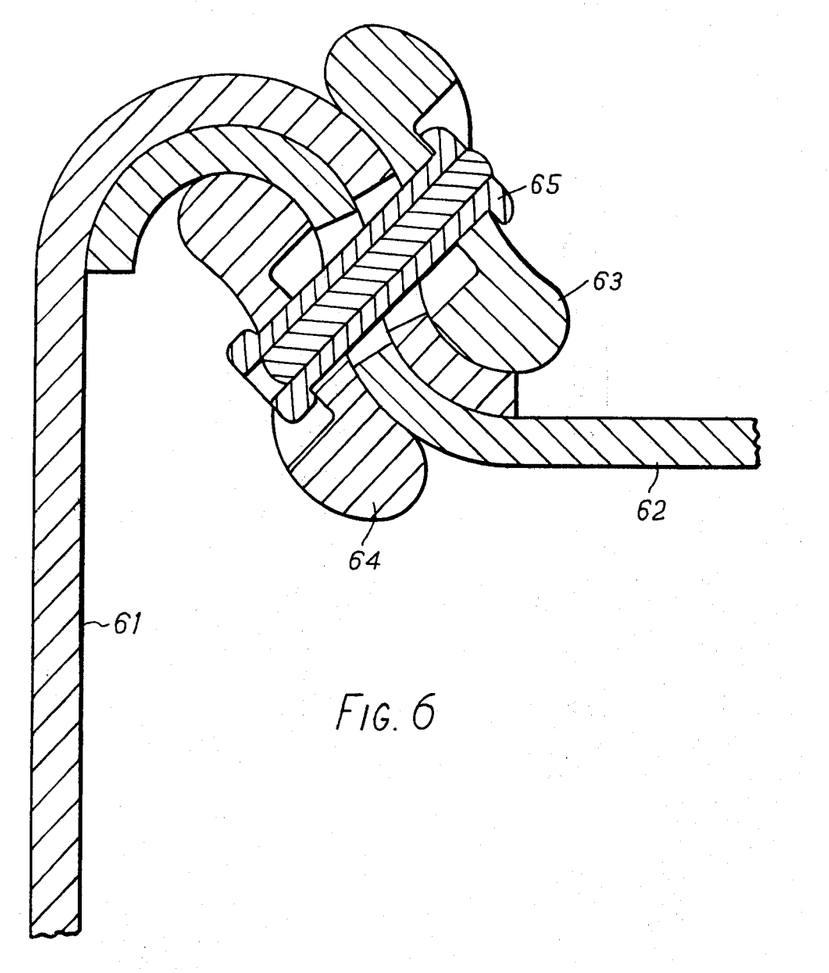
FIG. 6 shows a sixth joint between two sheets with the use of two bearing elements.

FIG. 6 illustrates a joint embodiment similar to that shown in FIG. 3, in which, however, the straight portions 31a, 31b and 31c, and also the portions 32a, 32b and 32c, have been reduced or totally eliminated by the illustrated mating curved shapes of the margins of the sheets 61 and 62, thus reducing the moments of couples at the joint. The illustrated joint includes two identical elements 63, 64, e.g. strips or extrusions, nesting, respectively, into the sheets 61 and 62 at the joint. In this joint again tensile fasteners 65 are used along the joint at a wide spacing. Other features and advantages are similar to those described in connection with the preceding figures.

Figure 7:
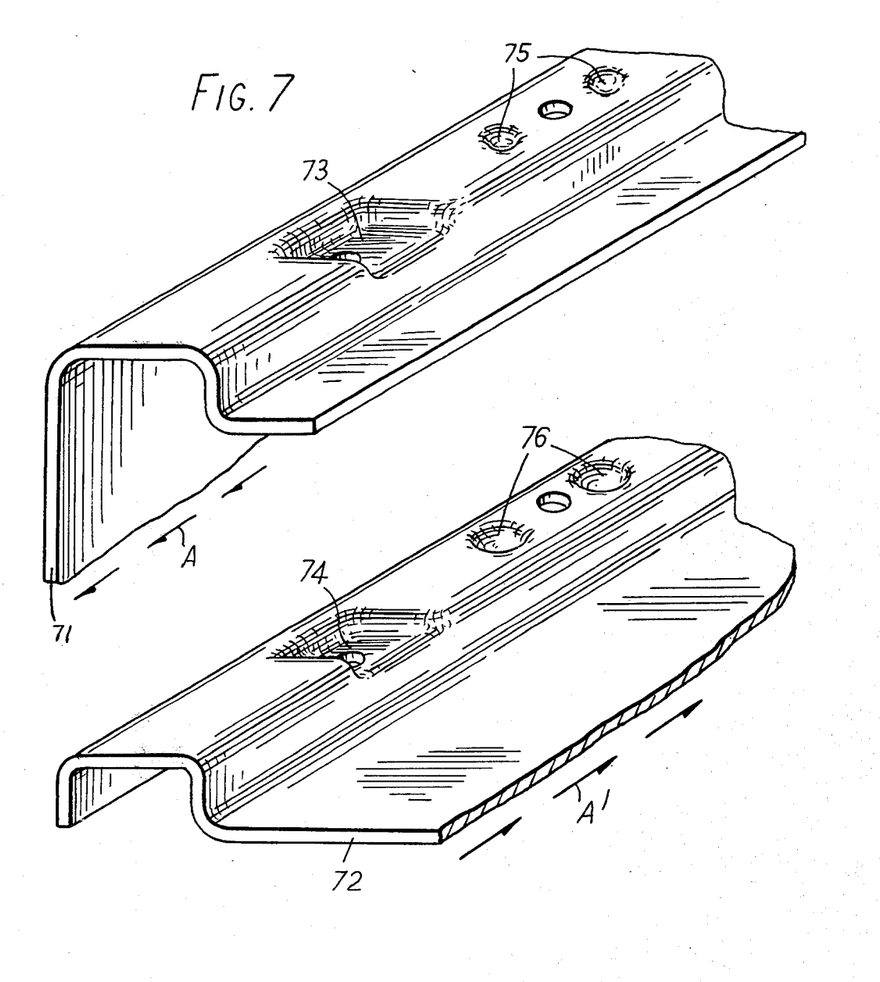
FIG. 7 shows a seventh joint between two sheets in two versions, namely with the use of two mating depressions and with the use of two pairs of mating dimples.

FIG. 7 illustrates a joint for the connection of two sheets 71 and 72, the adjacent margins of which are shaped substantially as shown in FIG. 3. This embodiment illustrates two of the many possible versions of transferring loads which act into and out of the plane of the preceding embodiments, normally termed shear loads.

The first version shows a depression 73 formed in the vertical sheet 71, which matches the form of a similar depression 74 in the horizontal sheet 72 at the interface of the two sheets. The shear loads A and A' are transferred through the joint by abutment of the sides of the two depressions 73 and 74.

The second version shows dimples 75 in the vertical sheet 71 which match the form of similar dimples 76 in the horizontal sheet 72 at the interface of the two sheets. The shear loads A and A' are transferred as before.

Other features of the joint can be generally as described earlier. The depressions 73, 74 and the dimples 75, 76 are shown symmetrically disposed around the clearance holes which are similar to the holes described in connection with FIG. 4. This is not essential but is likely to allow the most efficient shear transfer by holding the mating faces in intimate contact. Of course, much shear would be transferred by friction at the interface, but this is usually not taken into account in the analysis of structures, particularly aircraft structures.

Various applications of the invention to practical designs are described in the following.

Figures 8, 9:
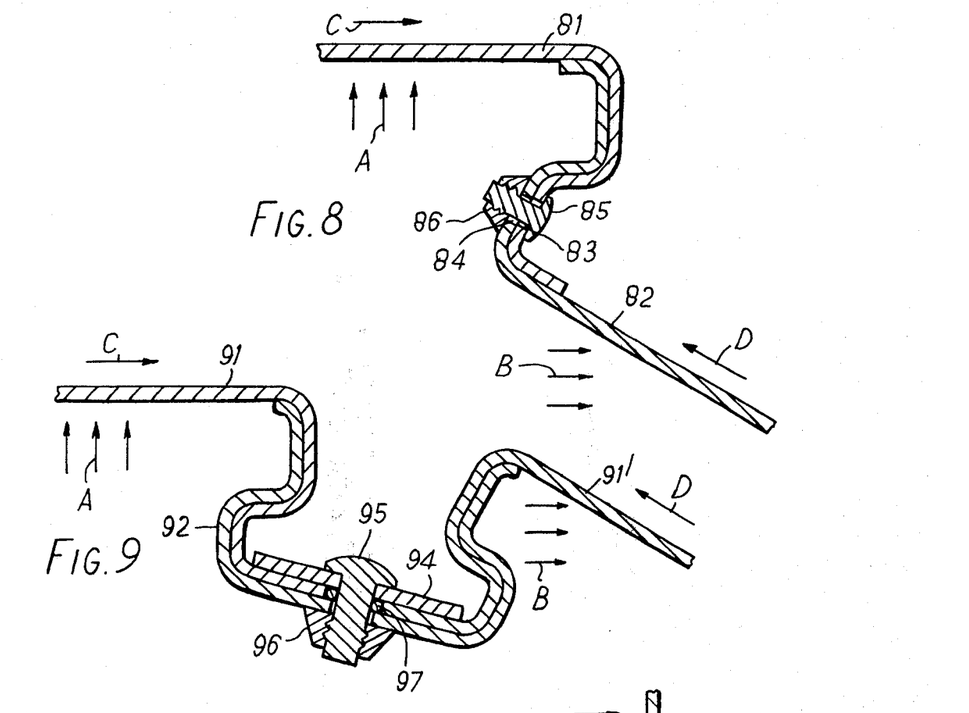
FIG. 8 shows an eighth joint between two sheets.
FIG. 9 shows a ninth joint between two sheets and a retaining profiled element using a bearing plate.

FIG. 8 illustrates a joint between a horizontal roof sheet 81 and a sloping side sheet 82 of a container which must restrain its contents under conditions of high acceleration generating vertical loads A or side loads B on the sheets 81, 82. Externally applied loads are small by comparison, arising from handling of the container. The smallest loadings are the components of the external side load in the directions C and D which are easily reacted by fasteners 85, 86 spaced along the joint. The illustrated fasteners are proprietary fasteners each of which consists of a headed serrated pin 85 passing through clearance holes 83 and 84 in the sheets 81 and 82, and a collar 86, which is deformed onto the serrations of the pin 85 to clamp the joint. The joint can be dismantled by cutting the fasteners and then springing the two sheets 81, 82 apart. Reassembly is the reverse of dismantling, namely springing the two sheets 81, 82 together and fitting new fasteners.

FIG. 9 illustrates an alternative joint between a roof sheet 91 and a side sheet 91', with the same vertical loads A and side loads B acting. Again the smallest loads are those in the directions C and D. In these examples both the sheets 91 and 91' fit into a retaining profiled element 92 shaped to match the sheets 91 and at the joint interfaces. A bearing plate 94 fits between the sheets 91 and 91' at the joint and is clamped by a two-part fastener 95, 96. An additional sealing element 97 of a compressible material, such as rubber, may be introduced as shown to prevent the ingress of e.g. moisture through the holes through which passes the shank of the fastener 95, 96. Dismantling and reassembly are carried out in the manner described in connection with FIG. 8.

Figure 10:
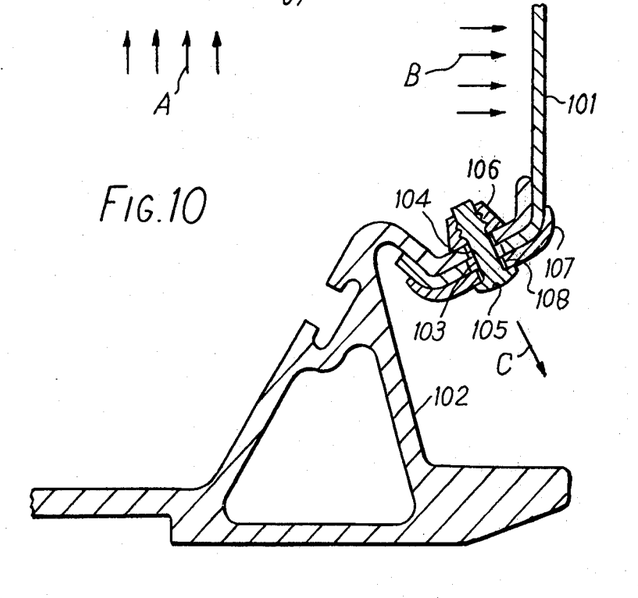
FIG. 10 shows a tenth joint between a sheet and a base of a container with the use of a profiled bearing plate.

FIG. 10 illustrates a joint between a vertical side sheet 101 and the base edge 102 of a container which must restrain its contents under conditions of high acceleration generating vertical loads A or side loads B on the sheet 101. Externally applied loads arising from handling of the the container are small by comparison, and the components of load in the direction C are easily reacted by two-part fasteners 105, 106 spaced along the joint as described earlier. The headed serrated pin 105 passes through a hole 108 in an element 107 which matches the external geometric form of the sheet 101 at the joint interface. It then passes through a clearance hole 103 in the sheet 101 and through a clearance hole 104 in the base edge 102, a collar 106 being deformed onto the portion of the pin 105 extending beyond the base edge 102 to clamp the joint. Dismantling and reassembly are carried out in a manner described in connection with FIG. 8.

Any of the methods of transferring shear loads described previously in connection with FIG. 7, can be applied to the joints according to FIGS. 8, 9 and 10. Examples of two embodiments combining, in general, the features of the joints illustrated in FIGS. 7 and 9 will now be described in connection with FIGS. 11 and 12.

Figure 11:
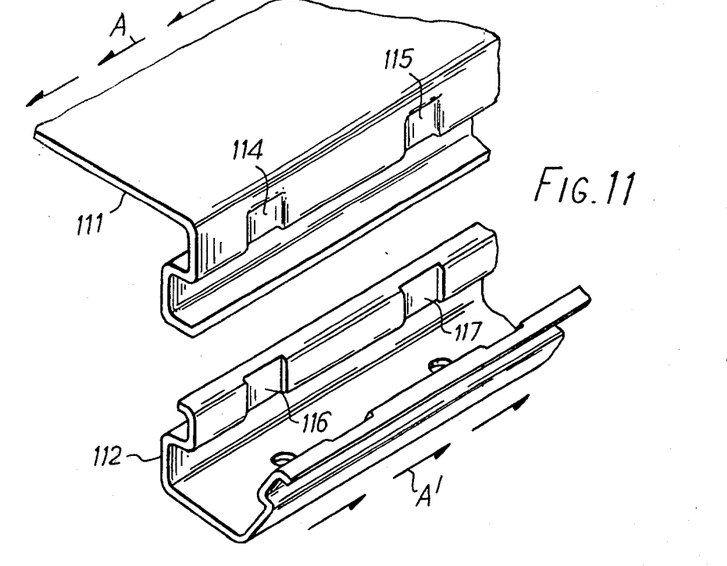
FIG. 11 shows an eleventh joint of two sheets (with the second sheet omitted) with a retaining profiled element, in which the sheets and the element have mating recesses.

FIG. 11 illustrates a joint of two sheets, namely of a sheet 111 and a sheet (not shown) which is a mirror image of the sheet 111, by means of a retaining profiled element 112. The sheet 111 has on one face of one of its margin portions substantially rectangular depressions 114 and 115, which make on the opposite face of that portion similarly shaped projections which fit, respectively, into substantially rectangular recesses 116 and 117 in a portion of the profile element 112 when the joint is assembled, to transfer shear loads A and A'.

Figure 12:
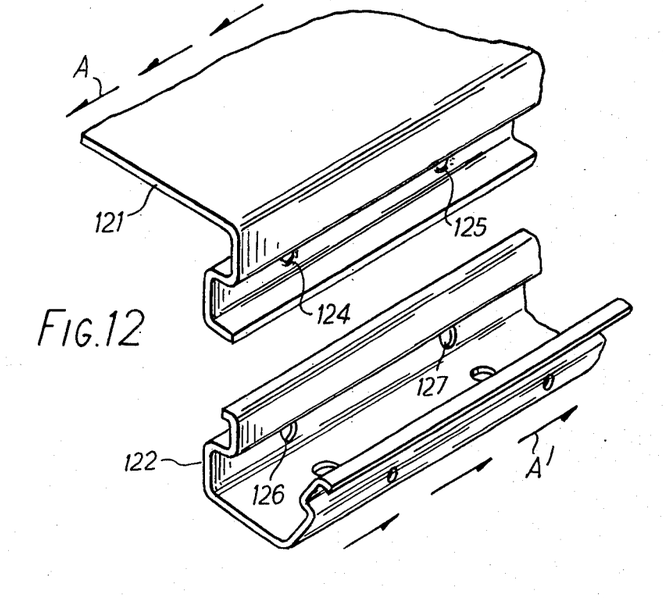
FIG. 12 shows a twelfth joint of two sheets (with the second sheet omitted) with a retaining profiled element, in which the sheets have dimples mating with holes in the element.

FIG. 12 shows a joint which is basically of the same type as the joint illustrated in FIG. 11, except that the sheet 121 is provided with dimples 124 and 125 which mate with holes 126 and 127 in the retaining profiled element 122 when the joint is assembled, to transfer the shear loads A and A'.

Figure 13:
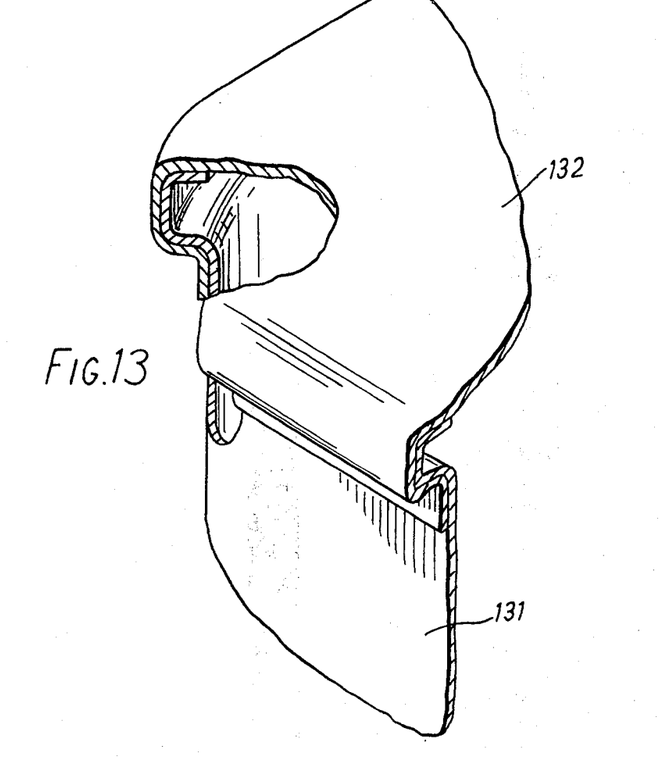
FIG. 13 shows a thirteenth joint between a part-cylindrical sheet and a sheet extending substantially perpendicularly thereto.

The invention is not restricted to straight joints but may be applied to other joint shapes as illustrated in FIG. 13 by the corner joint between a vertical part-cylindrical sheet 131 and a horizontal sheet 132 extending substantially perpendicularly thereto.

Figure 14:
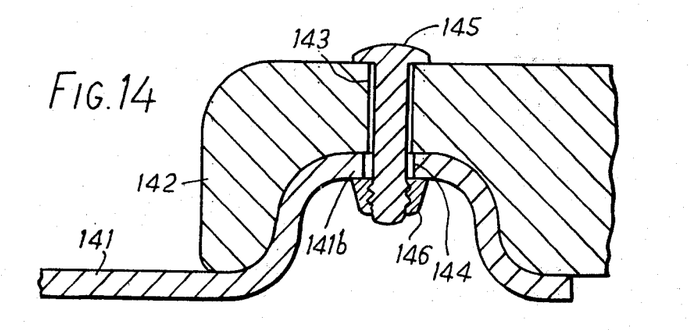
FIG. 14 shows a fourteenth joint between a sheet and a structural element.

FIG. 14 illustrates a joint between a sheet 141 and a structural element 142 embodying features of FIGS. 2, 4 and 6. It is similar to FIG. 2 in shape in that the straight portions 21a and 21c have been reduced or totally eliminated by the illustrated mating curved shapes of the margin of the sheet 141, thus reducing the moments or couples at the joint as for the joint of FIG. 6. The feature of FIG. 2 of a straight portion 21b has been retained as 141b for the incorporation of features of FIG. 4. The structural element and sheet are provided with clearance holes 143 and 144 (similar to 43 and 44) respectively so that they may be connected by a two-part fastener 145, 146 (similar to 45, 46). Other features and advantages are similar to those described earlier.

Figure 15:
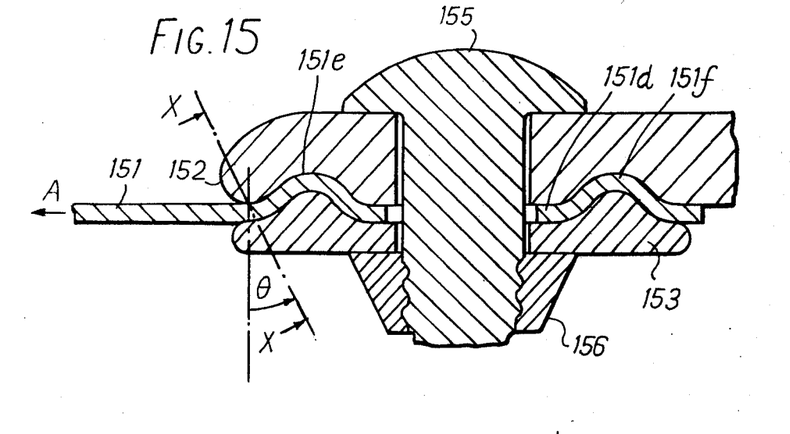
FIG. 15 shows a fifteenth joint between a sheet and a structural element using a bearing element.

FIG. 15 illustrates an embodiment obtained by further development of the embodiment shown in FIG. 14. The development consists in reducing further the offset of the mating curved shapes of the sheet 151 to the minimum whilst still maintaining sufficient shear area across the sheet at the section X—X for all angles $\theta$ to the vertical form 0° to 90° to react the applied tension load A equivalent to the tensile load capacity of the sheet material. The sheet 151 is prevented from sliding out of engagement with the structural element 152 by providing a bearing element 153 which matches the form of the sheet 151 at the mating surface. The joint is again provided with two-part tensile fasteners 155, 156 passing through clearance holes spaced along the joint, for which a straight portion 151d is provided in the sheet 151. Two trough-shaped portions 151e and 151f are provided in the embodiment to allow for symmetry of the bearing element 153, giving a further advantage that if yielding of the sheet material commences at portion 151e, part of the load A can be reacted at portion 151f. Other features and advantages are similar to those described earlier.

Figures 16, 17:
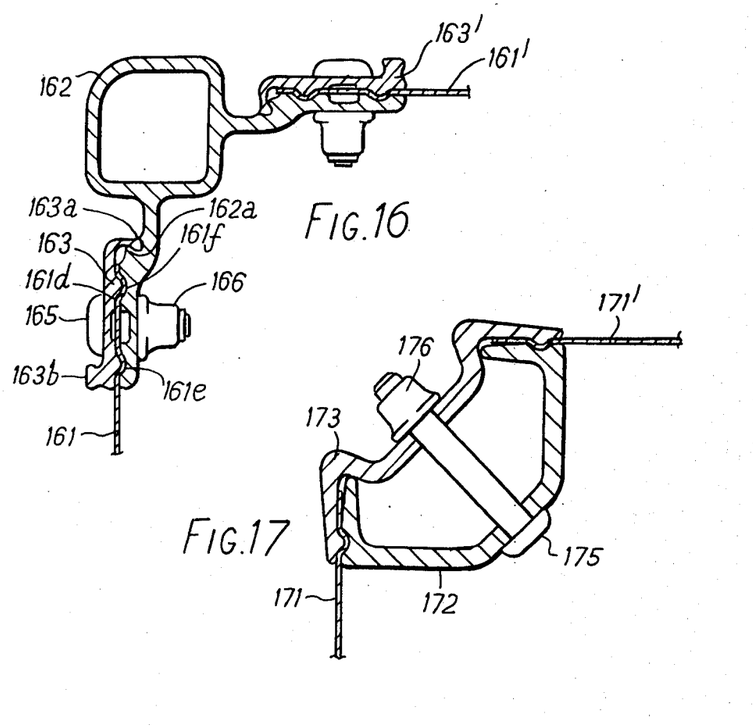
FIG. 16 shows a sixteenth joint between two sheets and a structural element using a bearing element.
FIG. 17 shows a seventeenth joint between two sheets and a structural element using two bearing elements.

FIG. 16 illustrates a sixteenth embodiment, which is a practical embodiment of that shown in FIG. 15 which shows a structural element 162 designed as a corner element and having two arms which are substantially at right angles to each other. To each of the arms is connected one sheet 161, 161', respectively, by means of a bearing element 163, 163'. The two sheets 161, 161' are connected to the structural element 162 in indentical manner and consequently only the connection of the sheet 161 will be described for simplicity. The arm to which the sheet 161 is connected includes a hook-shaped portion 162a engaging with a complementarily shaped portion 163a on the bearing element 163 to give better clamping at the portion 161f of the sheet 161. The portion 163b of the bearing element 163 is provided to give increased bending stiffness to the element 163 and therefore better clamping between the parts 165, 166 of the fastener to the portion 161e of the sheet 161.

FIG. 17 is a seventeenth embodiment obtained by further development of the embodiment shown in FIG. 9 for joining two sheets 171 and 171' to a structural element 172 which is a corner element. The element 172 is designed for the connection of the sheets 171 and 171' substantially at right angles to each other. It will be understood that it could be designed for the connection of the two sheet elements at a different angle. The sheets 171, 171' are prevented from sliding out of engagement with the structural element 172 by a bearing element 173. As is apparent from FIG. 17 each of the sheets 171, 171' has a trough-shaped part snugly accommodated in a complementarily shaped profiled part in the structural element 172, and the bearing element 173 has for each of the sheets 171, 171' a profiled part which engages into the trough-shaped parts of the respective sheets 171, 171'. The joint is again provided with a two-part tensile fastener 175, 176 which in this embodiment transmits the clamping load to the joint through the bodies of the elements 172 and 173 allowing one row of fasteners to clamp two joints. Other features and advantages are similar to those described earlier.

We claim:

1. An article comprising two sheets and a structural element, wherein each of said sheets has an elongate portion along which it is joined to said element, that portion being shaped to have an elongate, substantially trough-shaped part substantailly as long as said portion, and the structural element has for the trough-shaped part of each said sheet a respective complementarily shaped profiled part substantially as long as, and interengaged with, the trough-shaped part of the associated sheet, an intermediate portion interconnecting the profiled parts, the intermediate portion being provided with a plurality of holes, the joint including removable clamping means which, when the interengaged parts are subjected to forces acting substantailly transversely thereto, take up components of said forces which act in a direction tending to disengage said parts, the clamping means including a plurality of fasteners passing through at least some of said holes, each fastener having a first closing part and a second closing part between which are situated the sheets and the structural element, the trough-shaped parts and the profiled parts being so shaped that one of the parts is snugly interengageable with the associated part such that, where the parts are in contact with each other, loads transmitted, in use, between the sheet and the element are transmitted substantially by compression, that the parts are interengageable by simple insertion (as hereinbefore defined) of one of the parts into the other, and that the clamping means are, in use, stressed substantially only in tension.

2. An article according to claim 1 including a bearing element provided with holes, at least some of the holes accommodating one said fastener, whereby the bearing element is held in firm contact with the sheets.

3. An article comprising a sheet and a structural element, wherein the sheet has an elongate portion along which it is joined to said element, said portion being shaped to have two elongate spaced-apart substantially trough-shaped parts substantially as long as said portion, and the structural element has two complementarily shaped spaced-apart profiled parts substantially as long as and interengaged with the trough-shaped parts, the sheet having between the two trough-shaped parts a first portion provided with a plurality of first holes, and the structural element having between the two profiled parts a second portion provided with a plurality of second holes, at least some first holes communicating with at least some second holes, the joint including removable clamping means which, when the interengaged parts are subjected to forces acting substantially transversely thereto, take up components of said forces which act in a direction tending to disengage said parts, the clamping means including a plurality of fasteners passing through at least some of said communicating holes, each fastener having a first closing part and a second closing part between which are situated the sheet and the structural element, the trough-shaped parts and the profiled parts being so shaped that one of the parts is snugly interengageable with the associated part such that, where the parts are in contact with each other, loads transmitted, in use, between the sheet and the element are transmitted substantially by compression, that the parts are interengageable by simple insertion (as hereinbefore defined) of one of the parts into the other, and that the clamping means are, in use, stressed substantially only in tension a bearing element provided with two spaced-apart second profiled parts matching the trough-shaped parts and with a plurality of third holes for the fasteners between the profiled parts, the sheet being sandwiched between the structural element and the bearing element, the two elements being held in firm connection with the sheet by said fasteners.

4. An article according to claim 3 wherein one of said structural element and bearing element has a hook-shaped portion and the other of said bearing element and structural element has an anchoring portion interengageable with the hookshaped portion to provide additional resistance to transverse forces and additional clamping between the structural element and the bearing element.

* * * * *